(12) United States Patent
Hogg et al.

(10) Patent No.: US 8,941,941 B1
(45) Date of Patent: Jan. 27, 2015

(54) DISK DRIVE CALIBRATING TOUCHDOWN SENSOR

(71) Applicant: Western Digital Technologies, Inc., Irvine, CA (US)

(72) Inventors: Dennis W. Hogg, Laguna Hills, CA (US); Amy R. Lundberg, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/781,052

(22) Filed: Feb. 28, 2013

(51) Int. Cl.
*G11B 21/02* (2006.01)
*G01K 1/14* (2006.01)
*G01K 13/00* (2006.01)
*G11B 20/18* (2006.01)

(52) U.S. Cl.
CPC .................................... *G11B 20/18* (2013.01)
USPC ........................................... 360/75; 374/141

(58) Field of Classification Search
CPC ................................................... G11B 5/6076
See application file for complete search history.

(56) References Cited

U.S. PATENT DOCUMENTS

| | | | |
|---|---|---|---|
| 5,450,747 A | 9/1995 | Flechsig et al. | |
| 5,666,237 A | 9/1997 | Lewis | |
| 5,790,334 A | 8/1998 | Cunningham | |
| 5,808,184 A | 9/1998 | Boutaghou et al. | |
| 5,825,181 A | 10/1998 | Schaenzer et al. | |
| 5,901,001 A | 5/1999 | Meyer et al. | |
| 6,004,030 A | 12/1999 | Abraham et al. | |
| 6,018,789 A | 1/2000 | Sokolov et al. | |
| 6,019,503 A | 2/2000 | Abraham et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,130,793 A | 10/2000 | Ohmori et al. | |
| 6,145,052 A | 11/2000 | Howe et al. | |
| 6,175,457 B1 | 1/2001 | Flynn | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |

(Continued)

OTHER PUBLICATIONS

Carl E. Barlow, et al., U.S. Appl. No. 13/762,850, filed Feb. 8, 2013, 18 pages.

*Primary Examiner* — Daniell L Negron (57) ABSTRACT

A disk drive is disclosed comprising a head actuated over a disk, the head comprising a touchdown sensor. A bias signal is applied at a first bias value to the touchdown sensor and a corresponding first resistance of the touchdown sensor is measured. The bias signal is applied at a second bias value to the touchdown sensor and a corresponding second resistance of the touchdown sensor is measured. A reference resistance of the touchdown sensor is estimated based on the first and second bias values and the first and second resistances. An operating bias value is generated for the bias signal based on a predetermined operating temperature of the touchdown sensor, the reference resistance, and a thermal coefficient of resistance (TCR) of the touchdown sensor, wherein the TCR specifies a change in temperature of the touchdown sensor relative to a change in the resistance of the touchdown sensor.

23 Claims, 4 Drawing Sheets

(56) References Cited

U.S. PATENT DOCUMENTS

| | | |
|---|---|---|
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,262,858 B1 | 7/2001 | Sugiyama et al. |
| 6,263,459 B1 | 7/2001 | Schibilla |
| 6,272,694 B1 | 8/2001 | Weaver et al. |
| 6,275,029 B1 | 8/2001 | Schaff |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,739 B1 | 10/2001 | McEwen et al. |
| 6,310,740 B1 | 10/2001 | Dunbar et al. |
| 6,311,551 B1 | 11/2001 | Boutaghou |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,494,085 B2 | 12/2002 | Wakefield et al. |
| 6,499,083 B1 | 12/2002 | Hamlin |
| 6,504,662 B2 | 1/2003 | Sobey |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,556,366 B2 | 4/2003 | Patti et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,608,728 B1 | 8/2003 | Sugiyama |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,550 B2 | 4/2004 | Lim et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,039 B1 | 6/2004 | Cheng et al. |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,920,001 B2 | 7/2005 | Chua et al. |
| 6,928,470 B1 | 8/2005 | Hamlin |
| 6,930,844 B2 | 8/2005 | Yeh et al. |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,669 B2 | 9/2005 | Schaenzer et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |

(56) References Cited

U.S. PATENT DOCUMENTS

| | | |
|---|---|---|
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,016,131 B2 | 3/2006 | Liu et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,263 B2 | 4/2006 | Ottesen et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,097,110 B2 | 8/2006 | Sheperek et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,265,922 B2 | 9/2007 | Biskeborn et al. |
| 7,271,967 B2 | 9/2007 | Shi et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,459 B1 | 2/2009 | Schreck et al. |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,595,948 B1 | 9/2009 | Oberg |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,839,595 B1 | 11/2010 | Chue et al. |
| 7,843,660 B1 | 11/2010 | Yeo |
| 7,852,583 B2 | 12/2010 | Uji et al. |
| 7,852,596 B2 | 12/2010 | Boyle et al. |
| 7,859,782 B1 | 12/2010 | Lee |
| 7,872,822 B1 | 1/2011 | Rothberg |
| 7,872,824 B1 | 1/2011 | Macchioni et al. |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |

(56) References Cited

U.S. PATENT DOCUMENTS

| | | | |
|---|---|---|---|
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,031,420 B2 | 10/2011 | Mathew et al. |
| 8,040,625 B1 | 10/2011 | Boyle et al. |
| 8,045,283 B2 | 10/2011 | Yang et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,259,406 B2 | 9/2012 | Kazusawa et al. |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,477,455 B2 | 7/2013 | Furukawa et al. |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 2003/0210486 A1 | 11/2003 | Ottesen et al. |
| 2009/0113702 A1 | 5/2009 | Hogg |
| 2010/0306551 A1 | 12/2010 | Meyer et al. |
| 2011/0157736 A1 | 6/2011 | Contreras et al. |
| 2011/0226729 A1 | 9/2011 | Hogg |

(56) References Cited

U.S. PATENT DOCUMENTS

| | | | |
|---|---|---|---|
| 2012/0120982 A1* | 5/2012 | Anaya-Dufresne et al. | .. 374/141 |
| 2012/0158349 A1 | 6/2012 | Lee et al. | |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |
| 2013/0083430 A1 | 4/2013 | Chiu et al. | |
| 2013/0163110 A1 | 6/2013 | Garzon et al. | |
| 2014/0023108 A1* | 1/2014 | Johnson et al. | ................. 374/45 |

* cited by examiner

FIG. 4

DISK DRIVE CALIBRATING TOUCHDOWN SENSOR

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk. The head may be fabricated with a suitable touchdown sensor, such as a suitable magnetoresistive sensor, which may be used to detect defects on the disk, such as thermal asperities.

DETAILED DESCRIPTION

Figure 1A:
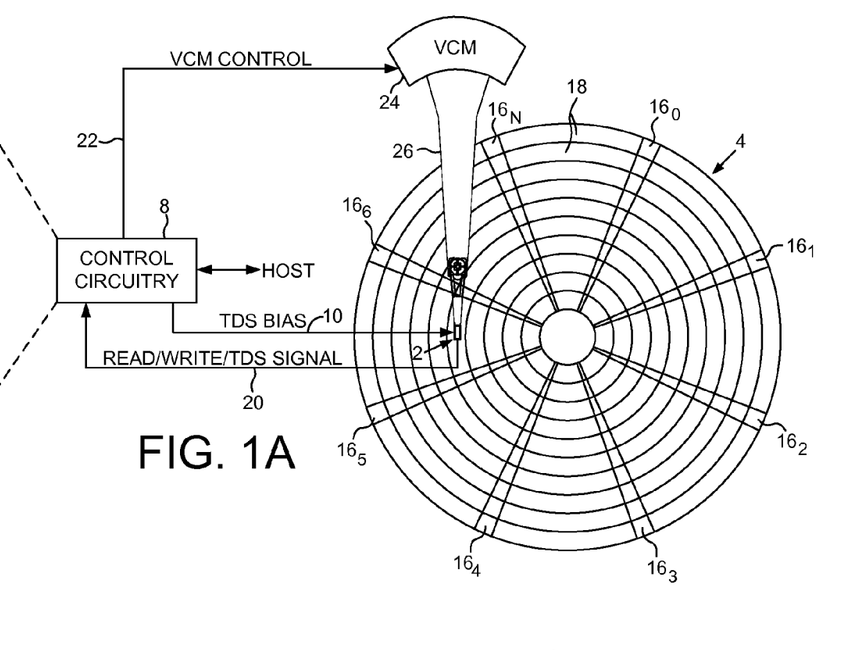
FIG. 1A shows a disk drive according to an embodiment comprising a head actuated over a disk.

FIG. 1A shows a disk drive according to an embodiment comprising a head 2 actuated over a disk 4, the head comprising a touchdown sensor 6 (FIG. 1B) comprising a resistance. The disk drive further comprises control circuitry 8 operable to execute the flow diagram of FIG. 1C, wherein a bias signal 10 is applied at a first bias value to the touchdown sensor and a corresponding first resistance of the touchdown sensor is measured (block 11). The bias signal 10 is applied at a second bias value to the touchdown sensor and a corresponding second resistance of the touchdown sensor is measured (block 12). A reference resistance of the touchdown sensor is estimated based on the first and second bias values and the first and second resistances (block 14), and an operating bias value is generated for the bias signal (block 15) based on a predetermined operating temperature of the touchdown sensor, the reference resistance, and a thermal coefficient of resistance (TCR) of the touchdown sensor, wherein the TCR specifies a change in temperature of the touchdown sensor relative to a change in the resistance of the touchdown sensor.

In the embodiment of FIG. 1A, the disk 4 comprises embedded servo sectors $16_0$-$16_N$ that define a plurality of servo tracks 18. The control circuitry 8 processes a read signal 20 emanating from the head 2 to demodulate the servo sectors $16_0$-$16_N$ and generate a position error signal (PES) representing an error between the actual position of the head and a target position relative to a target track. The control circuitry 8 filters the PES using a suitable compensation filter to generate a control signal 22 applied to a voice coil motor (VCM) 24 which rotates an actuator arm 26 about a pivot in order to actuate the head 2 radially over the disk in a direction that reduces the PES. The servo sectors $16_0$-$16_N$ may comprise any suitable position information, such as a track address for coarse positioning and servo bursts for fine positioning. The servo bursts may comprise any suitable pattern, such as the amplitude-based servo pattern, or a suitable phase-based servo pattern.

Figure 1B:
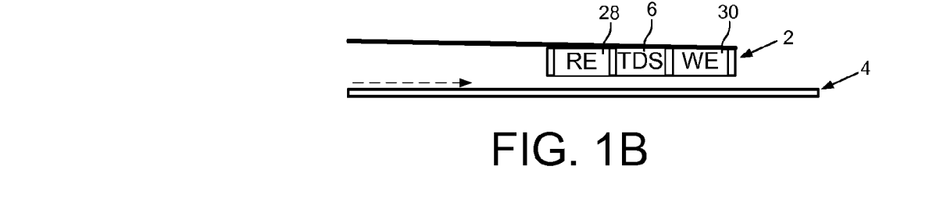
FIG. 1B shows an embodiment wherein the head comprises a touchdown sensor comprising a resistance.
Figure 1C:
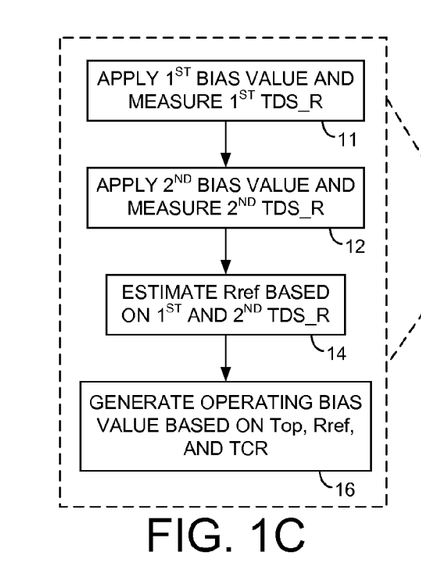
FIG. 1C is a flow diagram according to an embodiment of the present invention wherein a first and second resistance estimate of the touchdown sensor are measured corresponding to first and second bias values, and then a reference resistance is estimated for the touchdown sensor for use in generating an operating bias value for the touchdown sensor.

In the embodiment of FIG. 1B, the head 2 comprises a suitable read element 28 and a write element 30. The head 2 may also comprise a suitable fly height actuator, such as a suitable heater that controls the fly height of the head 2 over the disk 4 through thermal expansion. In one embodiment, a fly height control signal is applied to the fly height actuator to maintain a target fly height of the head 2 while scanning for defects on the disk using the touchdown sensor 6. Any suitable defects may be detected, such as asperities or recesses on the disk, wherein in one embodiment the defect causes a corresponding thermal response of the touchdown sensor 6.

In one embodiment, the bias signal 10 is applied to the touchdown sensor 6 in order to achieve a desired sensitivity during the defect scan operation. Any suitable touchdown sensor 6 may be employed in the embodiments of the present invention, such as a magnetoresistive sensor that exhibits a change in resistance relative to temperature. Since a defect on the disk 4 induces a temperature change in the touchdown sensor 6, in one embodiment the resulting change in resistance can be transduced into a defect detection signal, such as by measuring a change in current flowing through the touchdown sensor 6 while applying a constant voltage across the touchdown sensor 6.

In one embodiment, the touchdown sensor 6 is fabricated with a thermoresistive material having a thermal coefficient of resistance (TCR) that specifies the change in temperature relative to a change in the resistance of the material. In one embodiment the bias signal 10 applied to the touchdown sensor 6 will raise the temperature of the thermoresistive material (with a corresponding change in resistance); however, the degree to which the temperature of the touchdown sensor 6 rises depends on its geometry which varies due to tolerances in the fabrication process. For a particular setting of the bias signal 10, a larger (or thicker) touchdown sensor 6 may exhibit a lower temperature response (and corresponding resistance response) as compared to a smaller (or thinner) touchdown sensor 6. In one embodiment, in order to achieve a consistent performance for the defect scan operation (accurately detect true defects and minimizes false detections) across a family of disk drives, an operating value for the bias signal 10 is calibrated so as to achieve a target operating temperature for each touchdown sensor 6, thereby compensating for the differences in behavior. That is, with each touchdown sensor 6 biased to achieve a target operating temperature (and corresponding bias resistance), the response to the defects on the disk can be relatively consistent across the disk drives.

Figure 2A:
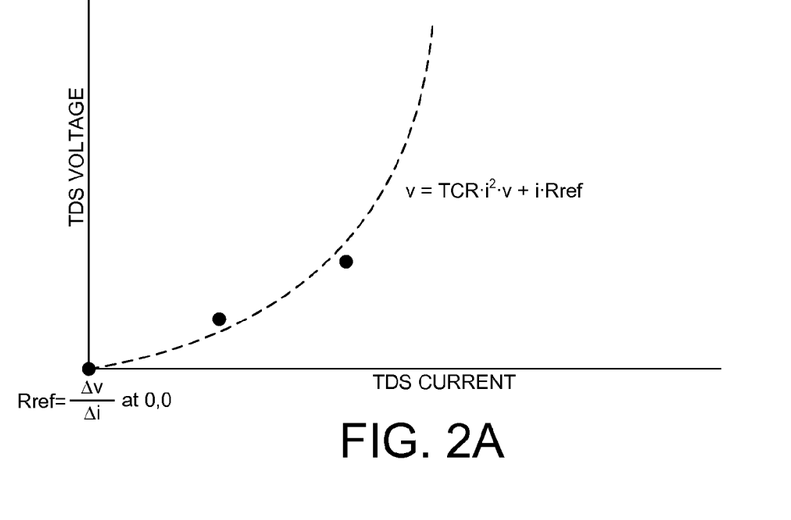
FIG. 2A is a graph illustrating a quadratic relationship between a voltage across the touchdown sensor and a current flowing through the touchdown sensor for use in estimating the reference resistance of the touchdown sensor according to an embodiment.

In one embodiment, a relationship between the voltage applied to the touchdown sensor and the current flowing through the touchdown sensor may be represented by a quadratic equation as shown in FIG. 2A:

$$v = TCR \cdot i^2 v + i \cdot Rref \qquad \text{Eq. 1}$$

where v represents the voltage across the touchdown sensor, i represents the current flowing through the touchdown sensor, TCR is the thermal coefficient of resistance of the touchdown sensor, and Rref represents the reference resistance of the touchdown sensor. Dividing both sides of the above Eq. 1 by the current i provides the following linear relationship:

$$\frac{v}{i} = TCR \cdot iv + Rref \qquad \text{Eq. 2}$$

Figure 2B:
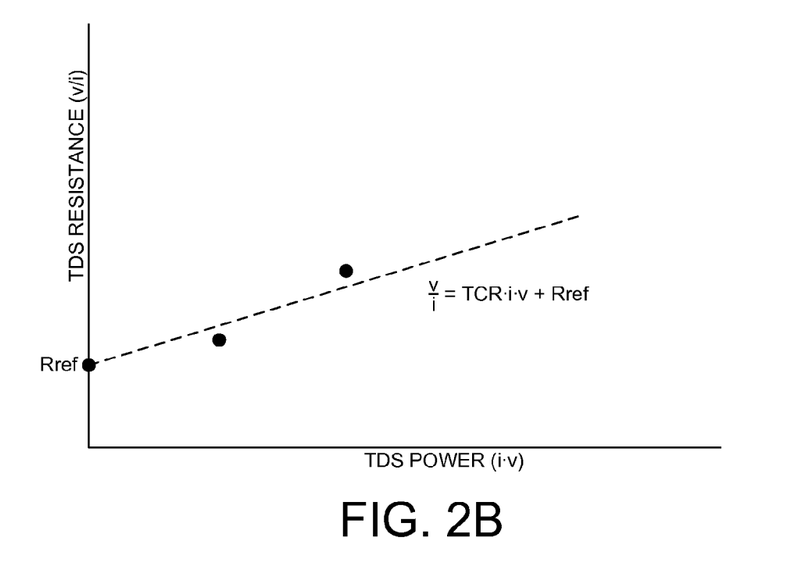
FIG. 2B is a graph illustrating a linear relationship between a resistance of touchdown sensor and a power applied to the touchdown sensor for use in estimating the reference resistance of the touchdown sensor according to an embodiment.

From the above Eq. 2, in one embodiment the resistance of the touchdown sensor is a linear function of the power applied to the touchdown sensor as shown in FIG. 2B, where TCR represents the slope of the line, and the reference resistance Rref is the resistance of the touchdown sensor when the bias signal (e.g., current or voltage) applied to the touchdown sensor is zero.

In one embodiment, the bias signal applied to the touchdown sensor comprises the voltage v applied across the touchdown sensor, and an operating voltage Vop is calibrated that will achieve a target operating temperature for the touchdown sensor based on the following equation:

$$Rhot = Rref \cdot (1 + (Top - Tref) \cdot TCR) \qquad \text{Eq. 3}$$

where Top represents the target operating temperature of the touchdown sensor, Tref represents a reference temperature, and Rhot represents the corresponding operating resistance of the touchdown sensor. After determining Rhot from the above Eq. 3, the corresponding operating voltage can be determined based on the above Eq. 2 according to:

$$Vop = \sqrt{\frac{(Rhot - Rref) \cdot Rhot}{TCR}} \qquad \text{Eq. 4}$$

In one embodiment, accurately estimating the operating voltage Vop for the touchdown sensor that will result in the target operating temperature (which corresponds to Rhot) depends on accurately estimating reference resistance Rref used in both Eq. 3 and Eq. 4.

In one embodiment, the reference resistance Rref is estimated based on a measured resistance of the touchdown sensor for at least two bias values of a bias signal applied to the touchdown sensor. For example, in one embodiment first and second bias voltages are applied to the touchdown sensor and the corresponding first and second resistances of the touchdown sensor are measured (e.g., by measuring the current flowing through the touchdown sensor). The reference resistance Rref of the touchdown sensor is then estimated based on the first and second voltages and the first and second resistances. For example, in one embodiment the two voltage:resistance points are fitted to a curve represented by a function (e.g., the quadratic function of FIG. 2A or the linear function of FIG. 2B), and then the reference resistance Rref computed based on the curve fitted function.

In one embodiment, the reference resistance Rref corresponds to the resistance of the touchdown sensor when the bias signal (e.g., voltage) applied to the touchdown sensor is substantially zero. Accordingly, in one embodiment the reference resistance Rref is estimated by curve fitting the voltage:resistance points shown in FIG. 2B to generate the corresponding linear function, and then estimating the reference resistance Rref based on this linear function at zero voltage. In another embodiment, the reference resistance Rref is estimated by curve fitting the voltage:resistance points shown in FIG. 2A to generate the corresponding quadratic function, and then estimating the reference resistance Rref based on the derivative of this quadratic function at zero voltage.

In the example embodiments shown in FIGS. 2A and 2B, the quadratic and linear functions are estimated based on two voltage:resistance points; however, any suitable number of voltage:resistance points may be measured before estimating the function used to estimate the reference resistance Rref. The accuracy of the estimated reference resistance Rref can improve if more voltage:resistance points are measured; however, measuring more voltage:resistance points can increase the calibration time.

In one embodiment, the reference resistance Rref is updated iteratively until it converges. Also in this embodiment the reference resistance Rref is initially estimated by applying a low bias signal to the touchdown sensor (e.g., a low voltage) when measuring the initial voltage:resistance points which helps ensure the touchdown sensor is not damaged due to being over stressed. Once the initial reference resistance Rref is estimated based on the low bias signal, in one embodiment Rref is used to estimate the operating resistance Rhot based on the above Eq. 3, which in turn is used to determine the corresponding operating voltage Vop based on the above Eq. 4. The operating voltage Vop is then applied to the touchdown sensor and the corresponding current measured in order to generate another voltage:resistance point that can be used to update the function for estimating the reference resistance Rref. This process is then iterated until a suitable criteria is met, such as the change in the reference resistance Rref falling below a threshold.

Figure 3:
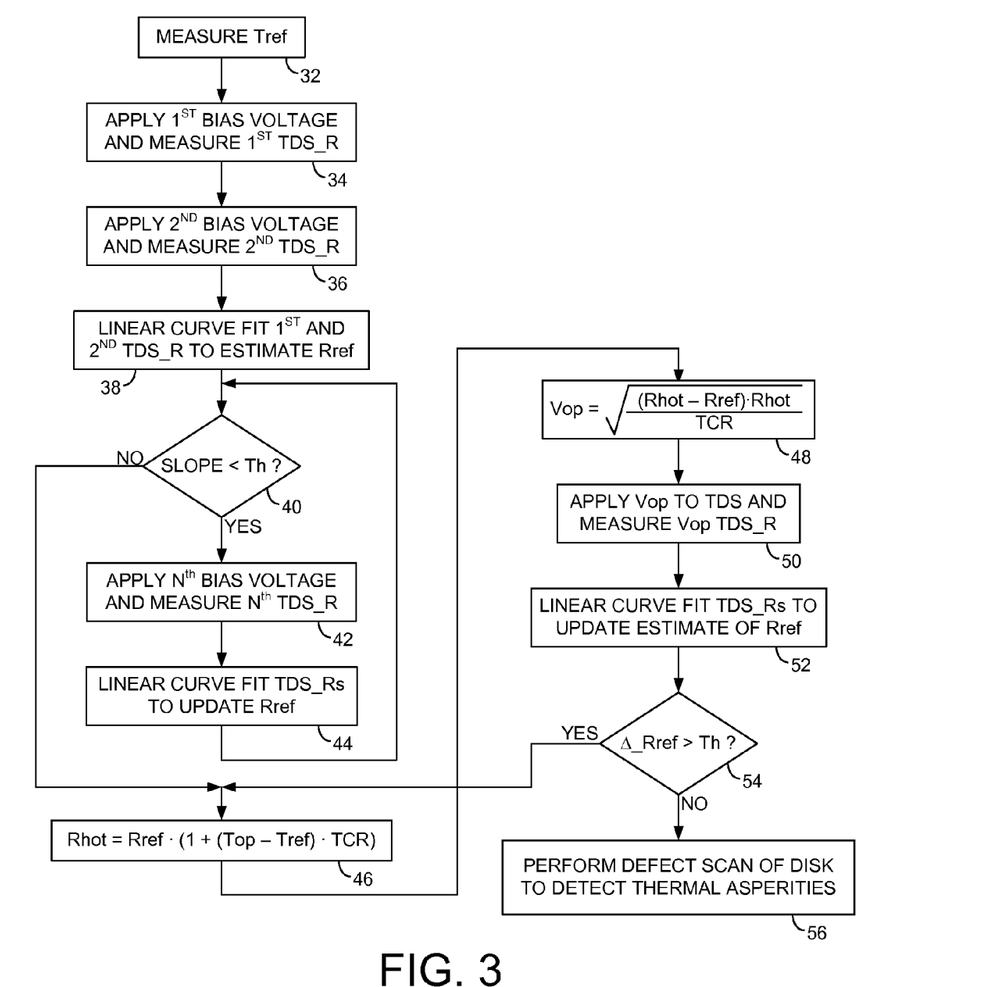
FIG. 3 is a flow diagram according to an embodiment for computing the reference resistance based on the linear relationship between the resistance of touchdown sensor and the power applied to the touchdown sensor.

An embodiment that updates the reference resistance Rref iteratively is shown in the flow diagram of FIG. 3. A reference temperature Tref is measured for the touchdown sensor that corresponds to a zero bias voltage applied to the touchdown sensor (block 32). A first bias voltage is applied to the touchdown sensor and a corresponding resistance measured (block 34), and a second bias voltage is applied to the touchdown sensor and a corresponding resistance is measured (block 36). These blocks may then be repeated to generate any suitable number of voltage:resistance points. The voltage:resistance points are then curve fitted to a linear function (block 38) as illustrated in FIG. 2B. If the slope of the linear function is less than a threshold (block 40), it is assumed that the estimated linear function is inaccurate due to an insufficient number of voltage:resistance points. Therefore another bias voltage is applied to the touchdown sensor and a corresponding resistance is measured (block 42). The voltage:resistance points are again curve fitted to the linear function (block 44) and the flow diagram repeats from block 40 until the slope of the linear function exceeds the threshold. In another embodiment, the voltage:resistance points may be measured until the difference between the slope of the estimated linear function and the TCR falls below a threshold (since the ideal slope represents the TCR). The reference resistance Rref is then estimated by setting the voltage bias to zero in the estimated linear function (see Eq. 2).

After estimating an initial reference resistance Rref based on the estimated linear function, the operating resistance Rhot of the touchdown sensor is computed using the above-described Eq. 3 (block 46). The corresponding operating voltage Vop is then computed using the above-described Eq. 4 (block 48). The computed operating voltage Vop is applied to the touchdown sensor and the resistance measured in order to generate another voltage:resistance point (block 50). The new voltage:resistance point is then used to update the estimate of the linear function (by again curve fitting) which in turn is used to update the estimate of the reference resistance Rref (block 52). If the delta in the reference resistance Rref is less than a threshold (block 54), it means the reference resistance Rref and the operating voltage Vop have converged to acceptable values so that the final operating voltage Vop will result in the desired operating temperature of the touchdown sensor while performing the defect scan of the disk (block 56). If the delta in the reference resistance Rref is greater than the threshold (block 54), the flow diagram of FIG. 3 is repeated from block 46 until the reference resistance Rref converges.

Figure 4:
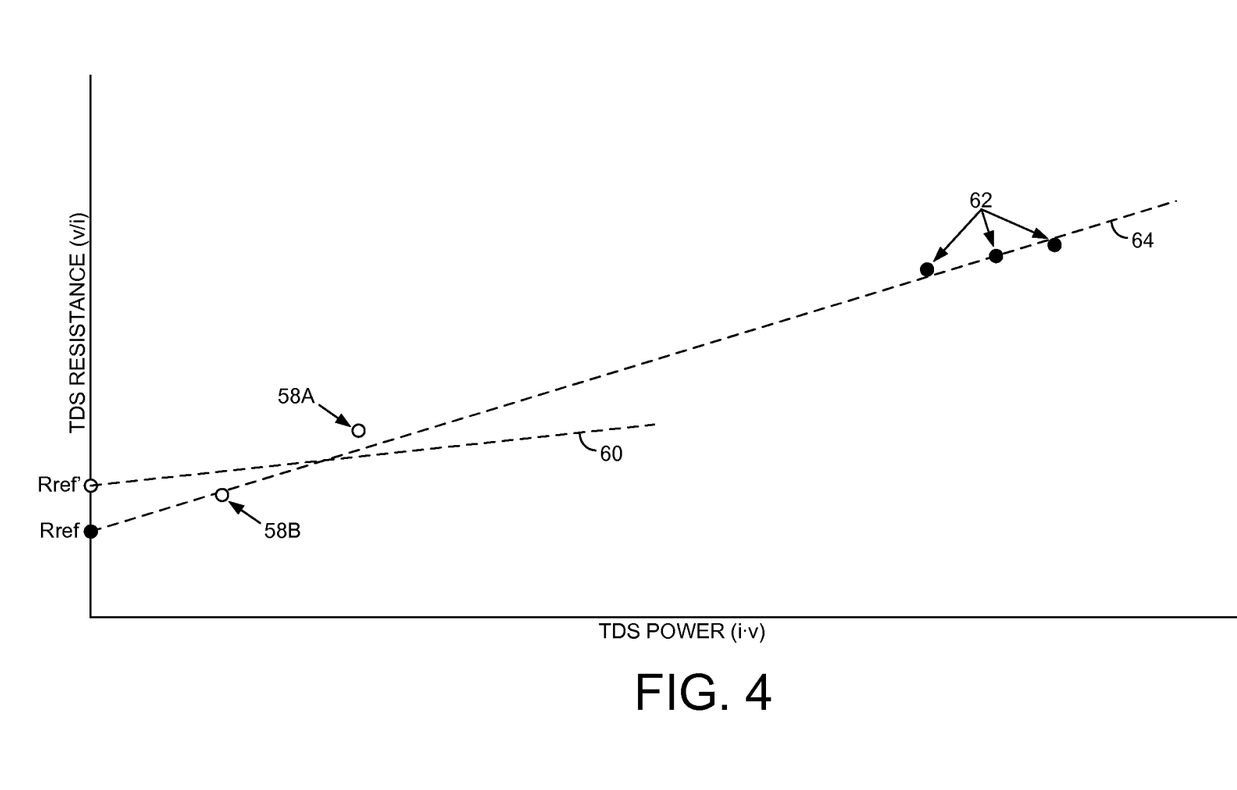
FIG. 4 is a graph illustrating an iterative technique for estimating the resistance of the touchdown sensor according to an embodiment.

FIG. 4 illustrates the iterative operation of the flow diagram of FIG. 3, wherein first and second voltage:resistance points 58A and 58B are used to generate the initial estimate of the linear relationship 60 used to estimate an initial reference resistance Rref'. As more voltage:resistance points 62 are generated based on the iterative procedure described above with reference to FIG. 3, the estimate of the linear function eventually converges to linear relationship 64 which is used to generate the final estimate for the reference resistance Rref.

The reference temperature Tref may be measured at block 32 of FIG. 3 using any suitable technique. In one embodiment, a dynamic fly height actuator is not used to control the fly height of the head, or the dynamic fly height actuator does not affect the temperature of the touchdown sensor 6. In this embodiment, the reference temperature Tref may be measured using any suitable temperature sensor capable of measuring the ambient temperature of the disk drive. In another embodiment, the disk drive comprises a suitable fly height actuator (e.g., a heater) for controlling the fly height of the head to a target fly height based on a calibrated power applied to the dynamic fly height actuator (e.g., based on a touchdown calibration procedure). The dynamic fly height actuator may heat the touchdown sensor, and therefore in one embodiment the reference temperature Tref may be determined based on a known relationship between the power applied to the dynamic fly height actuator and the resulting heating effect of the touchdown sensor. For example, a nominal relationship between the power applied to the fly height actuator and the heating of the touchdown sensor may be determined for a family of disk drives during a design stage of the disk drives. This nominal relationship may then be used in each individual disk drive to estimate the reference temperature Tref of the touchdown sensor based on the operating power applied to the dynamic fly height actuator that achieves the target fly height during the defect scan.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk, the head comprising a touchdown sensor comprising a resistance; and
   control circuitry operable to:
      apply a bias signal at a first bias value to the touchdown sensor and measure a corresponding first resistance of the touchdown sensor;
      apply the bias signal at a second bias value to the touchdown sensor and measure a corresponding second resistance of the touchdown sensor;
      estimate a reference resistance of the touchdown sensor based on the first and second bias values and the first and second resistances; and generate an operating bias value for the bias signal based on a predetermined operating temperature of the touchdown sensor, the reference resistance, and a thermal coefficient of resistance (TCR) of the touchdown sensor, wherein the TCR specifies a change in temperature of the touchdown sensor relative to a change in the resistance of the touchdown sensor, wherein the bias signal comprises a voltage and the control circuitry is operable to generate the operating bias value for the bias signal according to:

$$Vop = \sqrt{\frac{(Rhot - Rref) \cdot Rhot}{TCR}}$$

where:

Vop is the operating bias value;

Rhot is a resistance of the touchdown sensor at the operating temperature of the touchdown sensor; and Rref is the reference resistance of the touchdown sensor.

2. The disk drive as recited in claim 1, wherein the reference resistance corresponds to a resistance of the touchdown sensor when the bias signal is substantially zero.

3. The disk drive as recited in claim 1, wherein the control circuitry is further operable to curve fit the first and second resistances in order to estimate the reference resistance.

4. The disk drive as recited in claim 3, wherein the control circuitry is further operable to:

measure the first resistance based on a first voltage across the touchdown sensor and a first current flowing through the touchdown sensor;

measure the second resistance based on a second voltage across the touchdown sensor and a second current flowing through the touchdown sensor; and curve fit a relationship between the first and second voltages versus the first and second currents in order to estimate the reference resistance.

5. The disk drive as recited in claim 4, wherein:

the relationship comprises a quadratic function; and the control circuitry is operable to estimate the reference resistance based on a derivative of the quadratic function when the voltage across the touchdown sensor is substantially zero.

6. The disk drive as recited in claim 3, wherein the control circuitry is further operable to curve fit the first and second resistances to a line having a slope representing the TCR.

7. The disk drive as recited in claim 6, wherein the control circuitry is further operable to:

measure a power applied to the touchdown sensor; and curve fit the first and second resistances to the line representing a linear relationship between the first and second resistances and the corresponding power.

8. The disk drive as recited in claim 6, wherein when the slope is less than a threshold the control circuitry is further operable to:

apply the bias signal at a third bias value to the touchdown sensor and measure a corresponding third resistance of the touchdown sensor; and update the reference resistance of the touchdown sensor based on the first, second, and third bias values and the first, second, and third resistances.

9. The disk drive as recited in claim 8, wherein the control circuitry is further operable to curve fit the first, second, and third resistances in order to estimate the reference resistance.

10. The disk drive as recited in claim 1, wherein the control circuitry is further operable to:

apply the bias signal at the operating bias value to the touchdown sensor and measure a corresponding third resistance of the touchdown sensor;

update the reference resistance of the touchdown sensor based on the first, second, and operating bias values and the first, second, and third resistances; and update the operating bias value for the bias signal based on the updated reference resistance.

11. The disk drive as recited in claim 10, wherein the control circuitry is further operable to curve fit the first, second, and third resistances in order to update the reference resistance.

12. A method of operating a disk drive comprising a head actuated over a disk, the head comprising a touchdown sensor comprising a resistance, the method comprising:

applying a bias signal at a first bias value to the touchdown sensor and measure a corresponding first resistance of the touchdown sensor;

applying the bias signal at a second bias value to the touchdown sensor and measure a corresponding second resistance of the touchdown sensor;

estimating a reference resistance of the touchdown sensor based on the first and second bias values and the first and second resistances; and generating an operating bias value for the bias signal based on a predetermined operating temperature of the touchdown sensor, the reference resistance, and a thermal coefficient of resistance (TCR) of the touchdown sensor, wherein the TCR specifies a change in temperature of the touchdown sensor relative to a change in the resistance of the touchdown sensor, wherein the bias signal comprises a voltage and the operating bias value for the bias signal is generated according to:

$$Vop = \sqrt{\frac{(Rhot - Rref) \cdot Rhot}{TCR}}$$

where:

Vop is the operating bias value;

Rhot is a resistance of the touchdown sensor at the operating temperature of the touchdown sensor; and Rref is the reference resistance of the touchdown sensor.

13. The method as recited in claim 12, wherein the reference resistance corresponds to a resistance of the touchdown sensor when the bias signal is substantially zero.

14. The method as recited in claim 12, further comprising curve fitting the first and second resistances in order to estimate the reference resistance.

15. The method as recited in claim 14, further comprising:

measuring the first resistance based on a first voltage across the touchdown sensor and a first current flowing through the touchdown sensor;

measuring the second resistance based on a second voltage across the touchdown sensor and a second current flowing through the touchdown sensor; and curve fitting a relationship between the first and second voltages versus the first and second currents in order to estimate the reference resistance.

16. The method as recited in claim 15, wherein:

the relationship comprises a quadratic function; and the method further comprises estimating the reference resistance based on a derivative of the quadratic function when the voltage across the touchdown sensor is substantially zero.

17. The method as recited in claim 14, further comprising curve fitting the first and second resistances to a line having a slope representing the TCR.

18. The method as recited in claim 17, further comprising:
measuring a power applied to the touchdown sensor; and
curve fitting the first and second resistances to the line representing a linear relationship between the first and second resistances and the corresponding power.

19. The method as recited in claim 17, wherein when the slope is less than a threshold the method further comprises:
applying the bias signal at a third bias value to the touchdown sensor and measure a corresponding third resistance of the touchdown sensor; and
updating the reference resistance of the touchdown sensor based on the first, second, and third bias values and the first, second, and third resistances.

20. The method as recited in claim 19, further comprising curve fitting the first, second, and third resistances in order to estimate the reference resistance.

21. The method as recited in claim 12, further comprising:
applying the bias signal at the operating bias value to the touchdown sensor and measure a corresponding third resistance of the touchdown sensor;
updating the reference resistance of the touchdown sensor based on the first, second, and operating bias values and the first, second, and third resistances; and
updating the operating bias value for the bias signal based on the updated reference resistance.

22. The method as recited in claim 21, further comprising curve fitting the first, second, and third resistances in order to update the reference resistance.

23. A disk drive comprising:
a disk;
a head actuated over the disk, the head comprising a touchdown sensor comprising a resistance; and
control circuitry operable to:
apply a bias signal at a first bias value to the touchdown sensor and measure a corresponding first resistance of the touchdown sensor;
apply the bias signal at a second bias value to the touchdown sensor and measure a corresponding second resistance of the touchdown sensor;
estimate a reference resistance of the touchdown sensor based on the first and second bias values and the first and second resistances;
generate an operating bias value for the bias signal based on a predetermined operating temperature of the touchdown sensor, the reference resistance, and a thermal coefficient of resistance (TCR) of the touchdown sensor, wherein the TCR specifies a change in temperature of the touchdown sensor relative to a change in the resistance of the touchdown sensor;
apply the bias signal at the operating bias value to the touchdown sensor and measure a corresponding third resistance of the touchdown sensor;
update the reference resistance of the touchdown sensor based on the first, second, and operating bias values and the first, second, and third resistances; and
update the operating bias value for the bias signal based on the updated reference resistance.

* * * * *